(12) United States Patent
Guan et al.

(10) Patent No.: US 11,440,630 B2
(45) Date of Patent: Sep. 13, 2022

(54) SELF-RIGHTING UNMANNED SHIP SUITABLE FOR ADVERSE SEA CONDITIONS AND WORKING MODE THEREOF

(71) Applicant: Dalian University of Technology, Liaoning (CN)

(72) Inventors: Guan Guan, Liaoning (CN); Chao Ye, Liaoning (CN); Yan Lin, Liaoning (CN)

(73) Assignee: Dalian University of Technology, Dalian (CN)

( * ) Notice: Subject to any disclaimer, the term of this patent is extended or adjusted under 35 U.S.C. 154(b) by 523 days.

(21) Appl. No.: 16/595,530

(22) Filed: Oct. 8, 2019

(65) Prior Publication Data

US 2020/0047860 A1 Feb. 13, 2020

Related U.S. Application Data

(63) Continuation of application No. PCT/CN2017/117160, filed on Dec. 19, 2017.

(30) Foreign Application Priority Data

May 23, 2017 (CN) .......................... 201710367901.8

(51) Int. Cl.
| | |
|---|---|
| *B63B 43/04* | (2006.01) |
| *B63B 35/00* | (2020.01) |
| *B63H 21/21* | (2006.01) |
| *B63H 21/32* | (2006.01) |
| *G01C 19/60* | (2006.01) |

(52) U.S. Cl.
CPC ............. *B63B 43/04* (2013.01); *B63B 35/00* (2013.01); *B63H 21/21* (2013.01); *B63H 21/32* (2013.01); *G01C 19/60* (2013.01); *B63B 2035/007* (2013.01); *B63H 2021/216* (2013.01)

(58) Field of Classification Search
CPC ... B63B 43/04; B63B 35/00; B63B 2035/007; B63H 21/21; B63H 21/32; B63H 2021/216; G01C 19/60
See application file for complete search history.

(56) References Cited

U.S. PATENT DOCUMENTS

| | | | |
|---|---|---|---|
| 8,479,673 B1 * | 7/2013 | Ledder | ...................... B63B 3/40 114/65 R |
| 2014/0261126 A1 * | 9/2014 | Jenkins | ..................... B63G 8/38 114/39.26 |

FOREIGN PATENT DOCUMENTS

CN 106516022 A * 3/2017

* cited by examiner

*Primary Examiner* — Stephen P Avila

(57) ABSTRACT

Disclosed are a self-righting unmanned ship suitable for adverse sea conditions and a self-righting working mode thereof, belonging to the field of unmanned ship equipment and techniques. The unmanned ship comprises a main hull, a self-righting deck, an equipment and pipeline mast, a propeller, a radar, an air inlet and exhaust system, and a main engine system. Through the design of a watertight deck, the hull of the unmanned ship has a self-righting function, avoiding the possibility of the unmanned ship itself turning over, without installing additional self-righting equipment. Meanwhile, the internal structure and the self-righting working mode of the unmanned ship make it possible for the hull to automatically turn off the main engine and the air inlet and exhaust system when the heeling angle of the hull exceeds a certain angle, making the whole ship watertight.

3 Claims, 8 Drawing Sheets

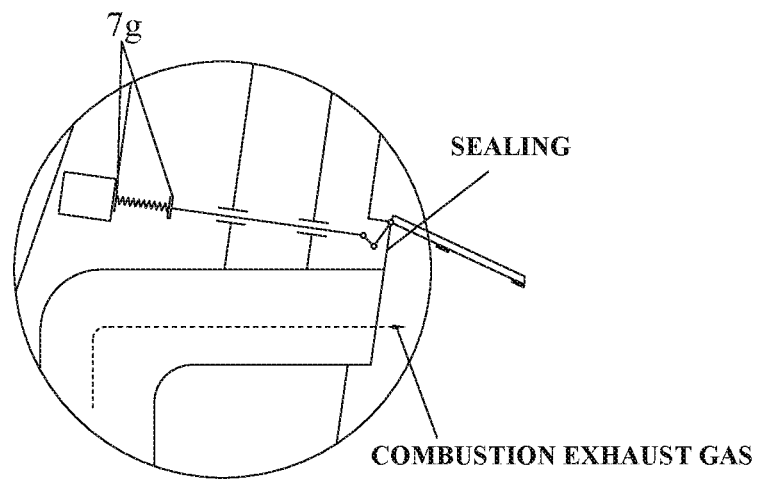
FIG. 11
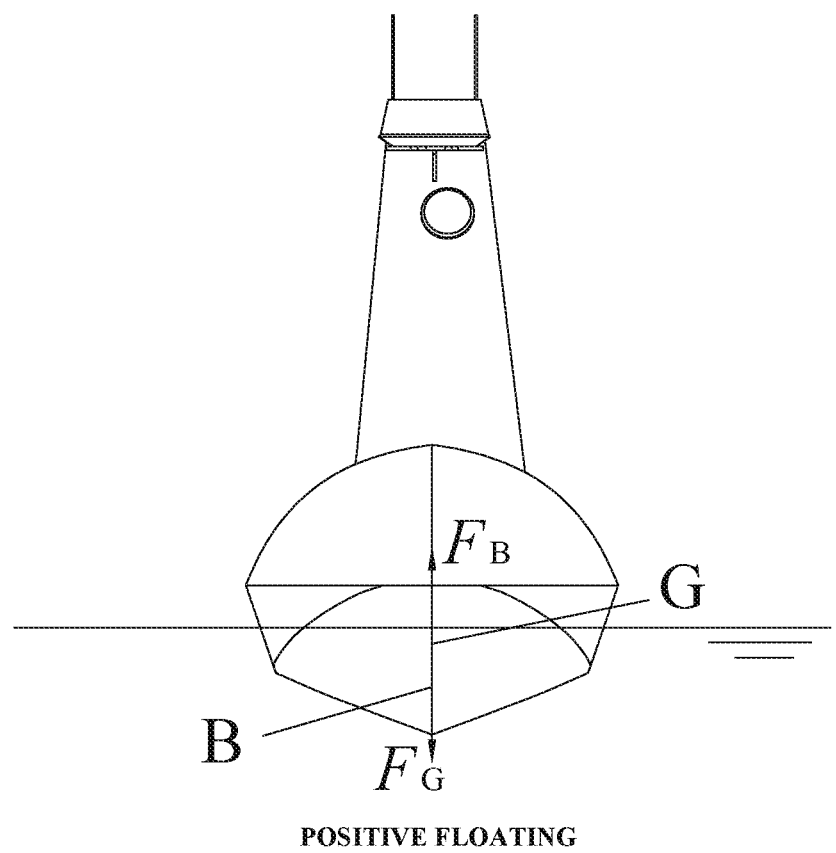
POSITIVE FLOATING

HEELING AT 0°-90°

HEELING AT 90°-180°

SELF-RIGHTING UNMANNED SHIP SUITABLE FOR ADVERSE SEA CONDITIONS AND WORKING MODE THEREOF

CROSS REFERENCE TO RELATED APPLICATIONS

The present application is a Continuation Application of PCT Application No. PCT/CN2017/117160 filed on Dec. 19, 2017, which claims the benefit of Chinese Patent Application No. 201710367901.8 filed on May 23, 2017. All the above are hereby incorporated by reference.

FIELD OF THE INVENTION

The present invention relates to a self-righting unmanned ship suitable for adverse sea conditions and a self-righting working mode thereof, belonging to the field of unmanned ship equipment and techniques.

DESCRIPTION OF THE RELATED ART

With the continuous improvement of the technologies of navigation systems and control systems, as well as the increasing demand for seabed exploration and maritime reconnaissance, the relevant technologies of marine unmanned ships have gradually developed. Marine unmanned ships can enable maritime detection and maritime exploration functions to be realized under the long-distance remote control or automatic control, effectively reducing labor costs and reducing the risk of personnel handling the ships. In order to increase the maneuverability of unmanned ships on the sea, the hull size is small compared to conventional medium and high speed ships. Although the ability of unmanned ships to effectively evade obstacles on the sea has been improved, their stability against wind and waves has been greatly reduced. With the unmanned ships' investigation and exploration of the sea to the deep sea, their possibility of encountering extreme sea conditions has greatly increased.

SUMMARY OF THE INVENTION

Technical Problem

Compared with a small manned ship, an unmanned ship has weak ability to detect and react to wind and waves under automatic control conditions, so its possibility of encountering extreme sea conditions and turning over is greatly increased. When the unmanned ship is heeled at an angle exceeding a certain angle or is turned over, it may cause the following phenomena: the crankshaft of the main engine cannot contact the oil and fail; the water from the propeller causes a sudden increase in the rotational speed and produces the phenomenon of "Flying Car"; and the ship cannot be self-righting while the power is lost and the final shipwreck is occurred.

Technical Solution

In order to overcome the problems of complicated equipment and insufficient protection of the propulsion system when the existing unmanned ship realizes the self-righting function, the present invention provides a self-righting unmanned ship suitable for adverse sea conditions and a self-righting working mode thereof. The unmanned ship adopts a watertight deck so that the hull has a self-righting function, avoiding the possibility of the unmanned ship itself turning over, without installing additional self-righting equipment. Meanwhile, its internal structure and equipment make it possible for the unmanned ship to automatically protect a propulsion system and effectively stop running when the heeling angle exceeds a certain angle, and the mechanism is easy to operate; and the unmanned ship ensures effective and continuous work during high speed sailing in the deep sea, and is a reliable, economical and efficient unmanned ship.

A technical solution adopted by the present invention is: a self-righting unmanned ship suitable for adverse sea conditions, wherein it comprises a self-righting deck, an equipment and pipeline mast, an air inlet system and a smoke exhaust system, it further comprises a main hull, a propeller, a radar and a radome, and a main engine system; the self-righting deck is a curved shape of a rear bulge in a streamline, is located above the main hull and is watertightly connected to the main hull; the equipment and pipeline mast is an obliquely backward shell structure, and is watertightly connected to the self-righting deck, a top part of an outside of the equipment and pipeline mast is arranged with several antennas, a front part of the outside is arranged with a radar seat and a mushroom-shaped air inlet cover, a rear part of the outside is arranged with a hinge-type smoke exhaust cover, and an interior of the equipment and pipeline mast is staggered with an air inlet system and a smoke exhaust system; the air inlet system is arranged inside the equipment and pipeline mast with an air inlet cover connection spring, an air inlet pipeline built-in electromagnet, a trumpet-shaped air inlet pipeline, an air inlet mechanism, an air inlet pipeline waterproof ring and air inlet mechanism metal pieces, the mushroom-shaped air inlet cover being attached inside the air inlet pipeline waterproof ring; the trumpet-shaped air inlet pipeline has a shape with a narrow top and a wide bottom, extends from the mushroom-shaped air inlet cover above a main engine air inlet pipe and maintains a proper clearance; the air inlet cover connection spring, the air inlet pipe built-in electromagnet, the air inlet mechanism and the air inlet mechanism metal piece are arranged inside the trumpet-shaped air inlet pipe, wherein the air inlet pipe built-in electromagnet is arranged at a corner of the trumpet-shaped air inlet pipe, and is attached with one air inlet mechanism metal piece, the other air inlet mechanism metal piece is separated from the air inlet mechanism metal piece attached to the air inlet pipe built-in electromagnet by the air inlet cover connection spring, and is connected to one end of the air inlet mechanism, and the other end of the air inlet mechanism is directly connected to the mushroom-shaped air inlet cover; the smoke exhaust system is arranged inside the equipment and pipeline mast with a smoke exhaust cover connection spring, a built-out electromagnet, a smoke exhaust pipeline, a smoke exhaust mechanism and smoke exhaust mechanism metal pieces; the smoke exhaust pipeline extends from the hinge-type smoke exhaust cover to a main engine exhaust pipe and connected to the main engine exhaust pipe through a flange; the built-out electromagnet is fixedly suspended from a rear part of an inside of the equipment and pipeline mast, and is attached with one smoke exhaust mechanism metal piece, and the other smoke exhaust mechanism metal piece is separated from the smoke exhaust mechanism metal piece attached to the built-out electromagnet by the smoke exhaust cover connection spring, and is connected to one end of the smoke exhaust mechanism; and the other end of the smoke exhaust mechanism is directly connected to the hinge-type smoke exhaust cover, and the hinge-type smoke exhaust cover is attached with an smoke exhaust pipeline waterproof ring therein.

A main engine of the main engine system is seated on a main engine base and is firmly connected, while the main engine is connected to the propeller by a shaft; and the main engine base, on which a digital gyroscope is arranged, is integrally connected with an internal structure of the main hull.

A self-righting working mode of the self-righting unmanned ship suitable for adverse sea conditions is that:
when the unmanned ship is heeled to a certain angle, the digital gyroscope sends a signal, the main engine stops running, the air inlet pipeline built-in electromagnet and the built-out electromagnet are powered on, the air inlet system and the smoke exhaust system are isolated from an external environment, the unmanned ship is completely watertight, and the unmanned ship is gradually self-righting, the digital gyroscope sends a signal again, the air inlet pipeline built-in electromagnet and the built-out electromagnet are powered off, the air inlet system and the smoke exhaust system are communicated with the external environment, and the main engine starts to run;
during turning off the air inlet system, the air inlet pipeline built-in electromagnet is powered on and attracts the air inlet mechanism metal piece, the air inlet cover connection spring is compressed, and then the air inlet mechanism is pulled, so that the mushroom-shaped air inlet cover is closed;
during turning on the air inlet system, the air inlet pipeline built-in electromagnet is powered off, the air inlet cover connection spring is restored to a normal state, and the mushroom-shaped air inlet cover is open topped by the air inlet mechanism;
during turning off the smoke exhaust system, the built-out electromagnet is powered on and attracts the smoke exhaust mechanism metal piece, the smoke exhaust cover connection spring is compressed, and then the smoke exhaust mechanism is pulled, so that hinge-type smoke exhaust cover is closed; and
during turning on the smoke exhaust system, the built-out electromagnet is powered off, the smoke exhaust cover connection spring is restored to a normal state, and the hinge-type smoke exhaust cover is open topped and rotated by a three-stage hinge of the smoke exhaust mechanism.

Advantageous Effects of the Invention

Beneficial Effects

The beneficial effects of the present invention are that: this self-righting unmanned ship suitable for adverse sea conditions that can realize the self-righting function, mainly comprises eight parts of the main hull, the self-righting deck, the equipment and pipeline mast, the propeller, the radar and the radome, the air inlet system, the smoke exhaust system and the main engine system. The unmanned ship has a simple structure, a closed watertight compartment consists of the main hull and the self-righting deck, and it is easy to manufacture without installing additional self-righting equipment. The equipment and pipeline mast fully consider the need of the radar and the radome to receive signals and the function of the main engine system to automatically turn on/off the air inlet system and the smoke exhaust system during the self-righting process, making the mechanism easy to operate and implement. The outlet designs of the air inlet system and the smoke exhaust system are designed with different structures by taking into account different working modes of air inlet and smoke exhaust, to ensure the air inlet efficiency, the smoke exhaust efficiency and the main engine waterproofing. The work flow of cooperation of the air inlet system, the smoke exhaust system and the main engine system ensures that the run and stop of the main engine would not bring additional danger to the unmanned ship. Compared with the traditional unmanned ship, the special structure and mechanism design of the unmanned ship ensure that it can sail under adverse sea conditions, while it has the characteristics of being economical, efficient, simple and easy to operate, and having strong engineering applications.

BRIEF DESCRIPTION OF THE DRAWINGS

Description of the Drawings

Figure 1:
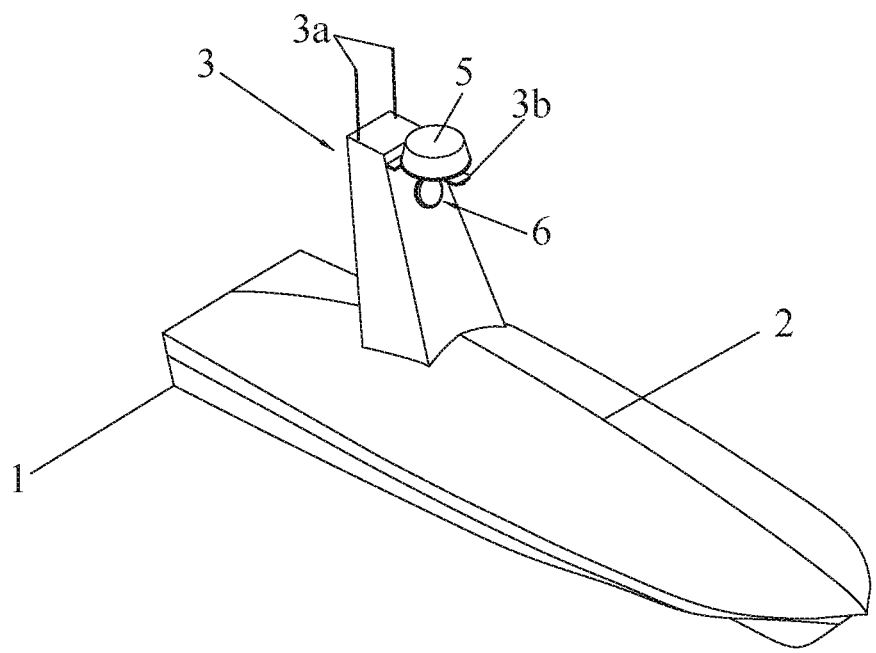
Figure 2:
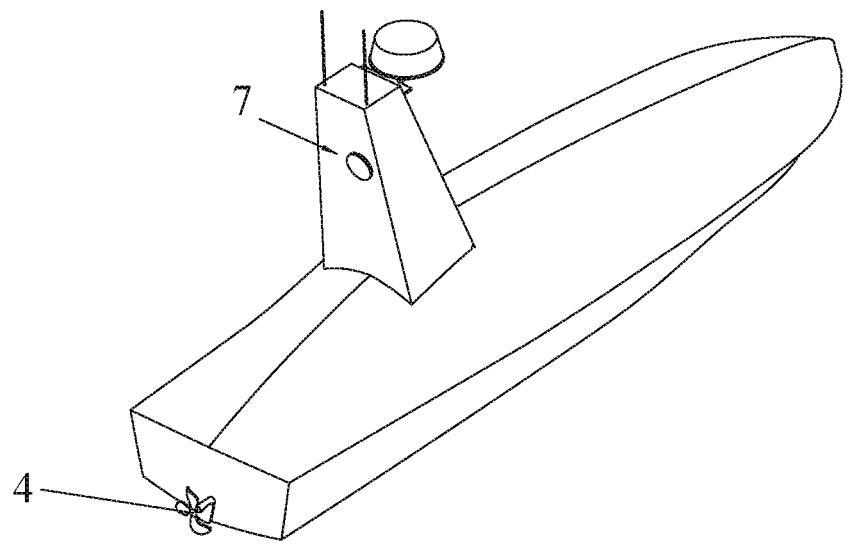
Figure 3:
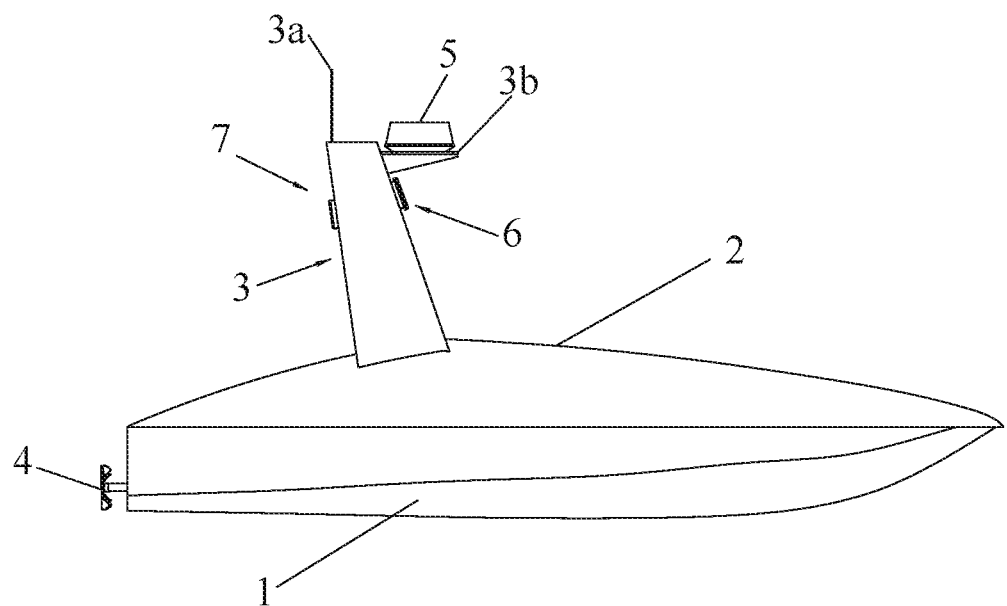
Figure 4:
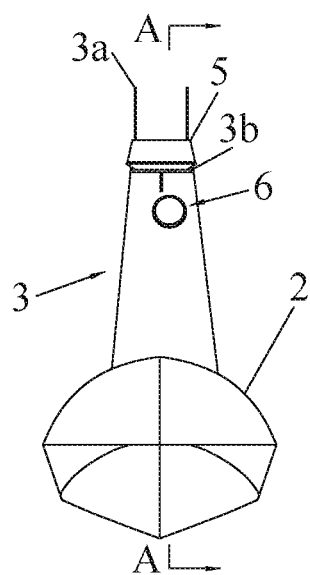
Figure 5:
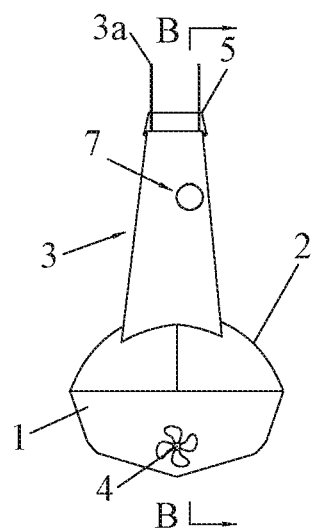
Figure 6:
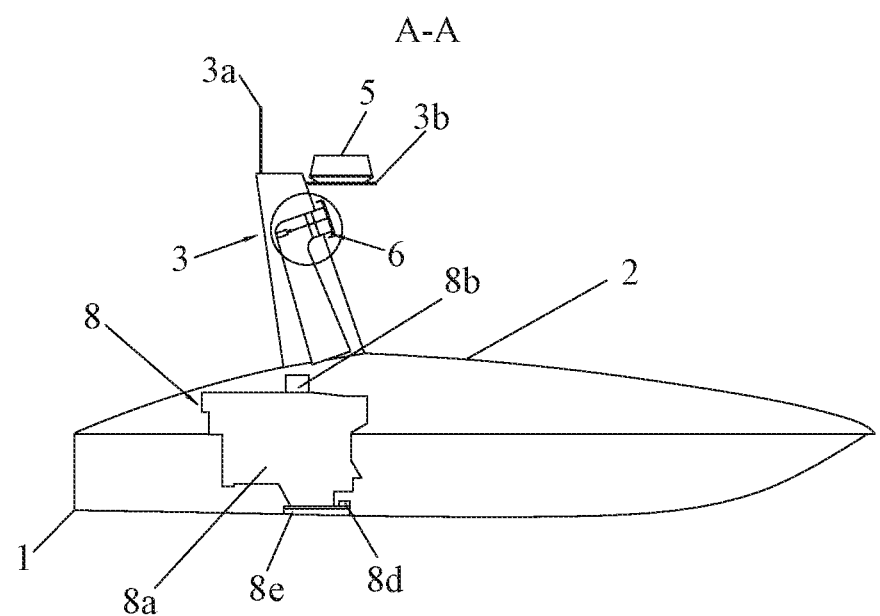
Figure 7:
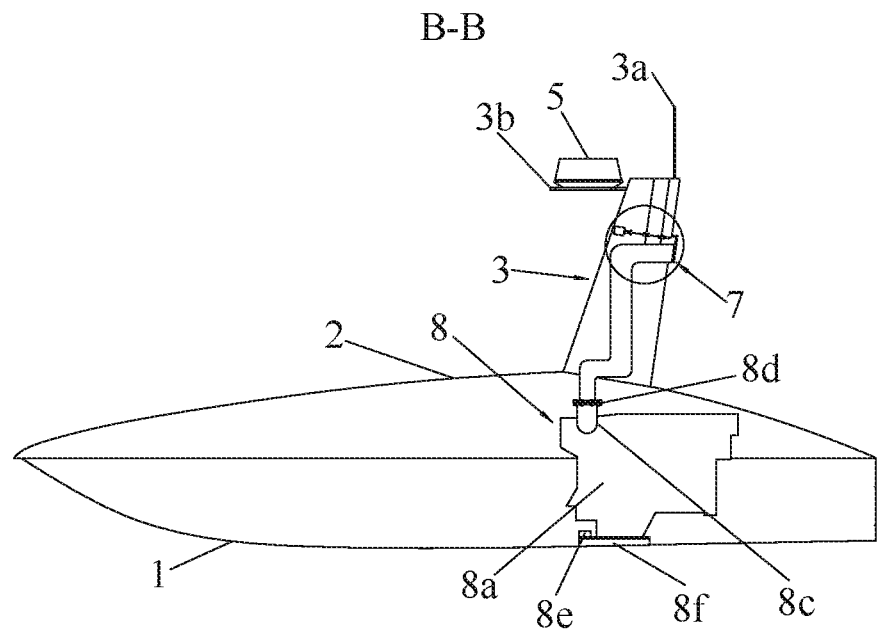
Figure 8:
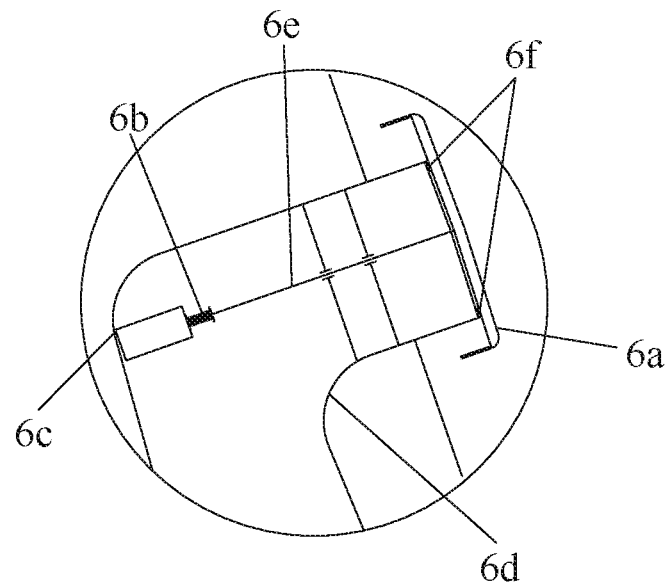
Figure 9:
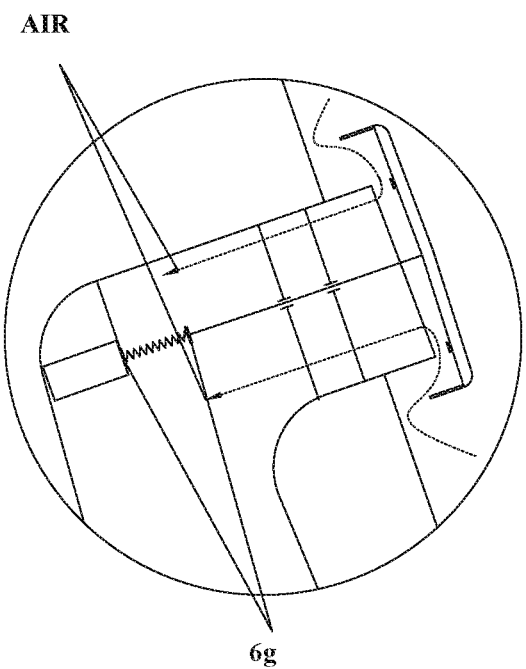
Figure 10:
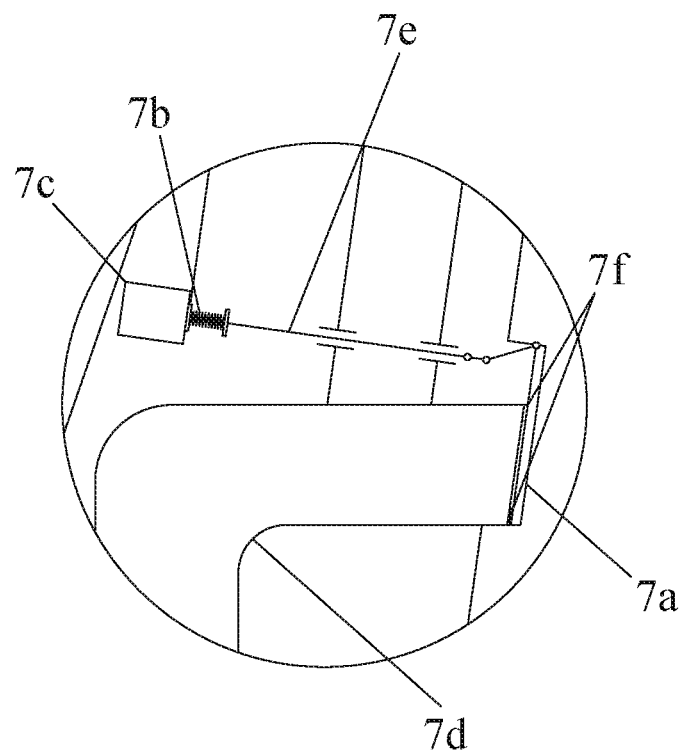
Figure 12:
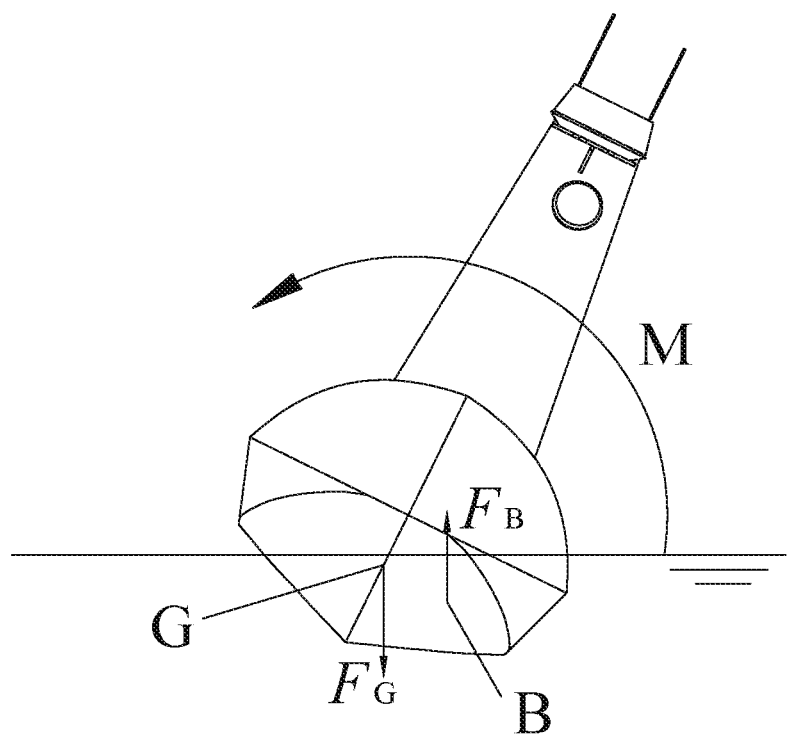
Figure 12:
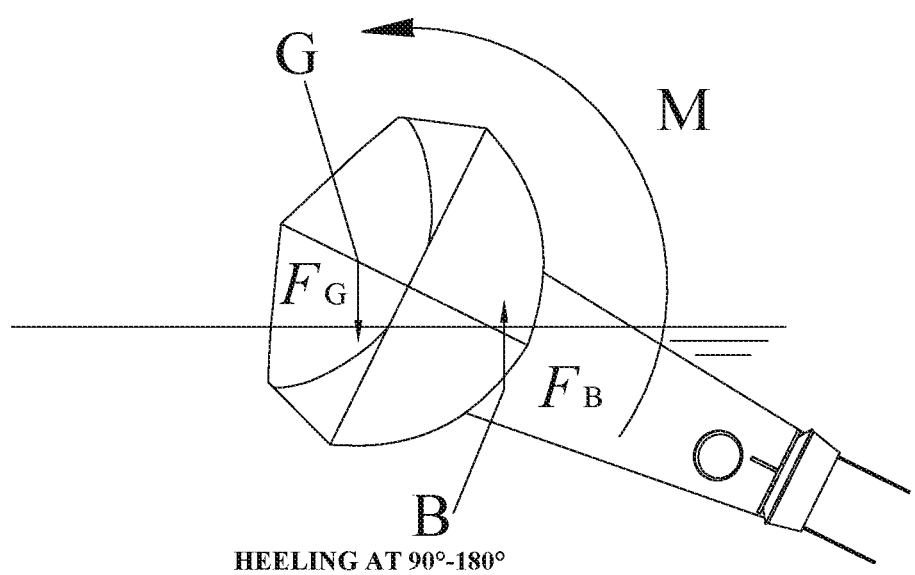
Figure 13:
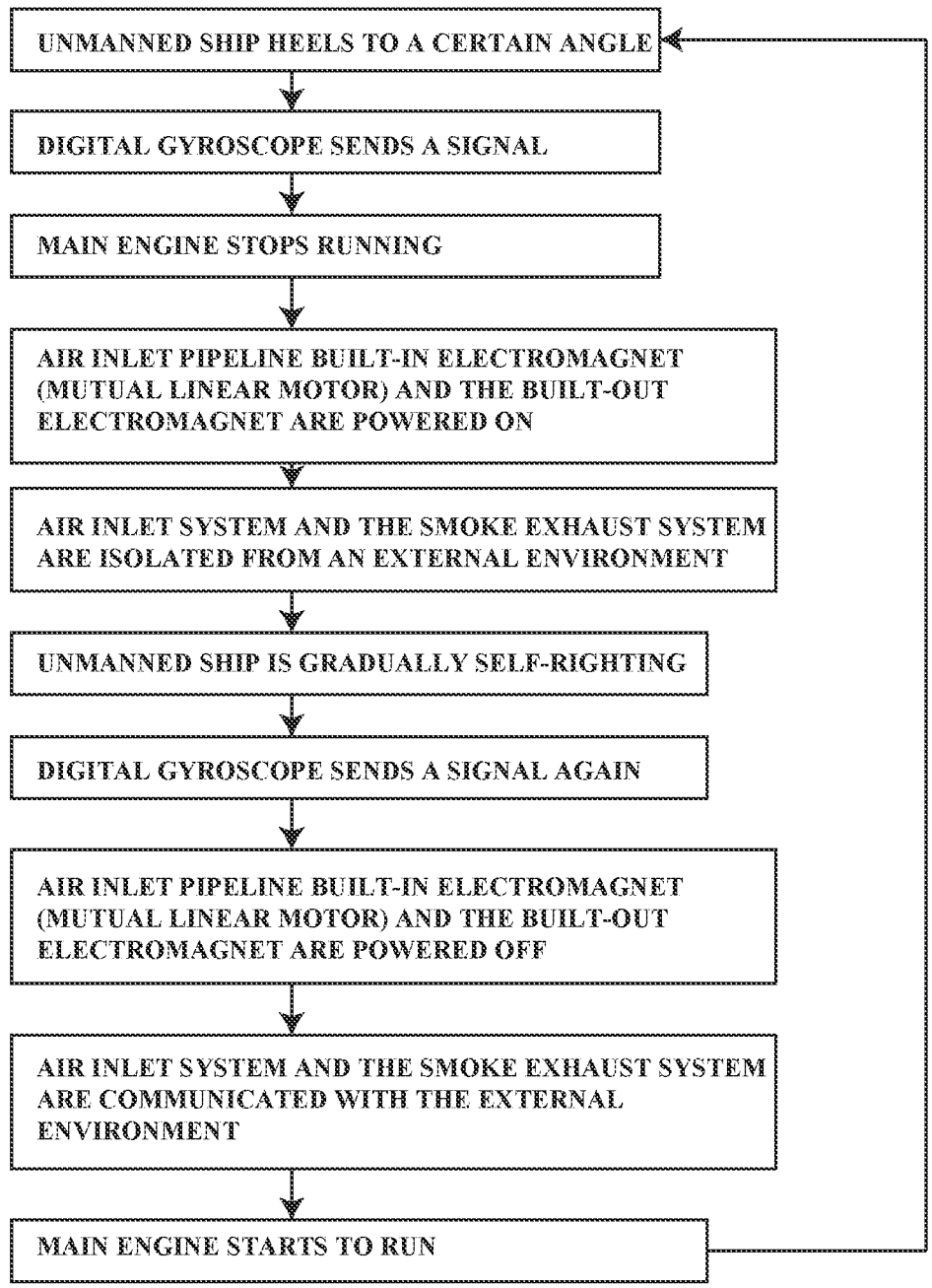

FIG. 1 is a first isometric view of a self-righting unmanned ship.
FIG. 2 is a second isometric view of the self-righting unmanned ship.
FIG. 3 is a front view of the self-righting unmanned ship.
FIG. 4 is a right view of the self-righting unmanned ship.
FIG. 5 is a left view of the self-righting unmanned ship.
FIG. 6 is a cross-sectional view taken along line A-A of FIG. 4.
FIG. 7 is a cross-sectional view taken along line B-B of FIG. 5.
FIG. 8 is a first state of a partially enlarged view of FIG. 6.
FIG. 9 is a second state of a partially enlarged view of FIG. 6.
FIG. 10 is a first state of a partially enlarged view of FIG. 7.
FIG. 11 is a second state of a partially enlarged view of FIG. 7.
FIG. 12 is a schematic diagram of the self-righting principle of the self-righting unmanned ship.
FIG. 13 is a flow chart of the self-righting function of the self-righting unmanned ship.
In the drawings: 1, main hull; 2, self-righting deck; 3, equipment and pipeline mast; 3a, antenna; 3b, radar seat; 4, propeller; 5, radar and radome; 6, air inlet system; 6a, mushroom-shaped air inlet cover; 6b, air inlet cover connection spring; 6c, air inlet pipeline built-in electromagnet (mutual linear motor); 6d, trumpet-shaped air inlet pipeline; 6e, air inlet mechanism; 6f, air inlet pipeline waterproof ring; 6g, air inlet mechanism metal piece; 7, smoke exhaust system; 7a, hinge-type smoke exhaust cover; 7b, smoke exhaust cover connection spring; 7c, built-out electromagnet (mutual linear motor); 7d, smoke exhaust pipeline; 7e, smoke exhaust mechanism; 7f, smoke exhaust pipeline waterproof ring; 7g, smoke exhaust mechanism metal piece; 8, main engine system; 8a, main engine; 8b, main engine air inlet pipe; 8c, main engine smoke exhaust pipe; 8d, flange; 8e, digital gyroscope; 8f, main engine base.

BEST EMBODIMENT FOR CARRYING OUT THE INVENTION

Best Mode of the Present Invention

The description of the best embodiment of the present invention is entered here.

EMBODIMENTS OF THE INVENTION

Modes of the Present Invention

The structure of the present invention will be further described below with reference to the accompanying drawings.

FIGS. 1 and 2 show isometric views of a self-righting unmanned ship suitable for adverse sea conditions. The unmanned ship mainly includes eight parts of a main hull 1, a self-righting deck 2, an equipment and pipeline mast 3, a propeller 4, a radar and a radome 5, an air inlet system 6, a smoke exhaust system 7, and a main engine system 8. The main hull 1 is a deep V-shaped line to reduce the navigational resistance, is connected with the self-righting deck 2 and is subjected to watertight treatment; the self-righting deck 2 is a streamlined structure with middle and rear bulges, and the parts of the bulges ensures the realization of self-righting and the arrangement of the main engine; the equipment and pipeline mast 3 is an obliquely rear shell structure containing the main parts of the air inlet system 6 and the smoke exhaust system 7 therein, and being externally connected with an antenna 3a and a radar seat 3b; the propeller 4 is located behind the stern of the main hull, and is connected to the main engine 8a by means of a shaft passing through the main hull 1; and the radar and the radome 5 are seated on the radar seat 3b and are connected to the radar seat 3b.

FIGS. 3, 4 and 5 show a front view, a right view and a left view of a self-righting unmanned ship suitable for use in adverse sea conditions, further illustrating the spatial distribution of various parts of FIGS. 1 and 2.

FIG. 6 shows a cross-sectional view of FIG. 4, wherein the main system 8 is wholly distributed in the middle and rear of the main hull 1 near the stern, the main engine 8a is seated on a main engine base 8f and is connected to the main hull 1 through the main engine base 8f, a main engine air inlet pipe 8b is located below a nozzle of a trumpet-shaped air inlet pipeline 6d with a certain interval to ensure that water droplets do not flow in from the main engine air inlet pipe 8b when water is accidentally entered, and the digital gyroscope 8e is connected to the main engine base 8f for monitoring the heeling angle of the unmanned ship and giving a signal; and the air inlet system 6 is mainly located inside the equipment and pipeline mast 3.

FIG. 7 shows a cross-sectional view of FIG. 5, wherein a main engine smoke exhaust pipe 8c extends outwardly from a side of the main engine and is directly connected to the smoke exhaust pipeline 7d through a flange 8d; and the smoke exhaust system 7 is mainly located inside the equipment and pipeline mast 3.

FIGS. 8 and 9 show two states of a partially enlarged view of FIG. 6, which correspond to closed and open states of a mushroom-shaped air inlet cover 6a, respectively. When the digital gyroscope 8e sends a signal so that an air inlet pipeline built-in electromagnet (a mutual linear motor) 6c is powered on and attracts an air inlet mechanism metal piece 6g, an air inlet cover connection spring 6b is then compressed, and an air inlet mechanism 6e is pulled so that the mushroom-shaped air inlet cover 6a is closed. The mushroom-shaped air inlet cover 6a is provided with an air inlet pipeline waterproof ring 6f to prevent leakage of water when the mushroom-shaped air inlet cover 6a is closed. When the digital gyroscope 8e sends a signal so that the air inlet pipeline built-in electromagnet (the mutual linear motor) 6c is powered off, the air inlet cover connection spring 6b is restored to a normal state, and the mushroom-shaped air inlet cover 6a is open topped by the air inlet mechanism 6e to make the air flow in.

FIGS. 10 and 11 show two states of a partially enlarged view of FIG. 7, which correspond to closed and open states of a hinge-type smoke exhaust cover 7a, respectively. When the digital gyroscope 8e sends a signal so that a built-out electromagnet (a mutual linear motor) 7c is powered on and attracts a smoke exhaust mechanism metal piece 7f, a smoke exhaust cover connection spring 7b is then compressed, and a smoke exhaust mechanism 7e is pulled so that the hinge-type smoke exhaust cover 7a is closed. The hinge-type smoke exhaust cover 7a is provided with a smoke exhaust pipeline waterproof ring 6f to prevent leakage of water when the hinge-type smoke exhaust cover 7a is closed. When the digital gyroscope 8e sends a signal so that the built-out electromagnet (the mutual linear motor) 7c is powered off, the smoke exhaust cover connection spring 7b is restored to a normal state, and the hinge-type smoke exhaust cover 7a is open topped and rotated by a three-stage hinge of the smoke exhaust mechanism 7e, so that the combustion exhaust gas is discharged.

FIG. 12 shows a schematic diagram of the self-righting principle of a self-righting unmanned ship suitable for adverse sea conditions. When the unmanned ship is in a positive floating state, a buoyancy force $F_B$ is balanced with a gravity $F_G$; when the unmanned ship is heeled at 0°-90° in any direction, a torque generated by the buoyancy force $F_B$ generated mainly by the main hull 1 and the gravity $F_G$ is opposite to the heeling direction of the unmanned ship, preventing the unmanned ship from continuing to heel; and when the unmanned ship is heeled at 90°-180° in any direction, the torque generated by the buoyancy force $F_B$ generated mainly by the self-righting deck 2 and the equipment and pipeline mast 3 and the gravity $F_G$ is opposite to the heeling direction of the unmanned ship, preventing the unmanned ship from continuing to heel and being self-righting.

FIG. 13 shows a flow chart of the self-righting function of a self-righting unmanned ship suitable for adverse sea conditions.

INDUSTRIAL APPLICABILITY

This self-righting unmanned ship suitable for adverse sea conditions that can realize the self-righting function, mainly comprises eight portions of the main hull, the self-righting deck, the equipment and pipeline mast, the propeller, the radar and the radome, the air inlet system, the smoke exhaust system and the main engine system. The unmanned ship has a simple structure, a closed watertight compartment consists of the main hull and the self-righting deck, and it is easy to manufacture without installing additional self-righting equipment. The equipment and pipeline mast fully consider the need of the radar and the radome to receive signals and the function of the main engine system to automatically turn on/off the air inlet system and the smoke exhaust system during the self-righting process, making the mechanism easy to operate and implement. The outlet designs of the air inlet system and the smoke exhaust system are designed with different structures by taking into account different working modes of air inlet and smoke exhaust, to ensure the air inlet efficiency, the smoke exhaust efficiency and the main engine waterproofing. The work flow of cooperation of the air inlet system, the smoke exhaust system and the main engine system ensures that the run and stop of the main engine would not bring additional danger to the unmanned ship.

Compared with the traditional unmanned ship, the special structure and mechanism design of the unmanned ship ensure that it can sail under adverse sea conditions, while it has the characteristics of being economical, efficient, simple and easy to operate, and having strong engineering applications.

What is claimed is:

1. A self-righting unmanned ship suitable for adverse sea conditions, comprising a self-righting deck (2), an equipment and pipeline mast (3), an air inlet system (6) and a smoke exhaust system (7), characterized in that: the ship further comprises a main hull (1), a propeller (4), a radar and a radome (5), and a main engine system (8); the self-righting deck (2) is a curved shape of a rear bulge in a streamline, is located above the main hull (1) and is watertightly connected to the main hull (1); the equipment and pipeline mast (3) is an obliquely backward shell structure, and is watertightly connected to the self-righting deck (2), a top part of an outside of the equipment and pipeline mast (3) is arranged with several antennas (3a), a front part of the outside is arranged with a radar seat (3b) and a mushroom-shaped air inlet cover (6a), a rear part of the outside is arranged with a hinge-type smoke exhaust cover (7a), and an interior of the equipment and pipeline mast (3) is staggered with an air inlet system (6) and a smoke exhaust system (7); the air inlet system (6) is arranged inside the equipment and pipeline mast (3) with an air inlet cover connection spring (6b), an air inlet pipeline built-in electromagnet (6c), a trumpet-shaped air inlet pipeline (6d), an air inlet mechanism (6e), an air inlet pipeline waterproof ring (6f) and air inlet mechanism metal pieces (6g), the mushroom-shaped air inlet cover (6a) being attached inside the air inlet pipeline waterproof ring (6f); the trumpet-shaped air inlet pipeline (6d) has a shape with a narrow top and a wide bottom, extends from the mushroom-shaped air inlet cover (6a) above a main engine air inlet pipe (8b) and maintains a proper clearance; the air inlet cover connection spring (6b), the air inlet pipeline built-in electromagnet (6c), the air inlet mechanism (6e) and the air inlet mechanism metal piece (6g) are arranged inside the trumpet-shaped air inlet pipeline (6d), wherein the air inlet pipeline built-in electromagnet (6c) is arranged at a corner of the trumpet-shaped air inlet pipeline (6d), and is attached with one air inlet mechanism metal piece (6g), the other air inlet mechanism metal piece (6g) is separated from the air inlet mechanism metal piece (6g) attached to the air inlet pipeline built-in electromagnet (6c) by the air inlet cover connection spring (6b), and is connected to one end of the air inlet mechanism (6e), and the other end of the air inlet mechanism (6e) is directly connected to the mushroom-shaped air inlet cover (6a); the smoke exhaust system (7) is arranged inside the equipment and pipeline mast (3) with a smoke exhaust cover connection spring (7b), a built-out electromagnet (7c), a smoke exhaust pipeline (7d), a smoke exhaust mechanism (7e) and smoke exhaust mechanism metal pieces (7g); the smoke exhaust pipeline (7d) extends from the hinge-type smoke exhaust cover (7a) to a main engine exhaust pipe (8c) and connected to the main engine exhaust pipe (8c) through a flange (8d); the built-out electromagnet (7c) is fixedly suspended from a rear part of an inside of the equipment and pipeline mast (3), and is attached with one smoke exhaust mechanism metal piece (7g), and the other smoke exhaust mechanism metal piece (7g) is separated from the smoke exhaust mechanism metal piece (7g) attached to the built-out electromagnet (7c) by the smoke exhaust cover connection spring (7b), and is connected to one end of the smoke exhaust mechanism (7e); and the other end of the smoke exhaust mechanism (7e) is directly connected to the hinge-type smoke exhaust cover (7a), and the hinge-type smoke exhaust cover (7a) is attached with an smoke exhaust pipeline waterproof ring (7f) therein.

2. The self-righting unmanned ship suitable for adverse sea conditions according to claim 1, characterized in that: a main engine (8a) of the main engine system (8) is seated on a main engine base (8f) and is firmly connected, while the main engine (8a) is connected to the propeller (4) by a shaft; and the main engine base (80, on which a digital gyroscope (8e) is arranged, is integrally connected with an internal structure of the main hull (1).

3. The self-righting working mode of the self-righting unmanned ship suitable for adverse sea conditions according to claim 1, characterized in that:

when the unmanned ship is heeled to a certain angle, the digital gyroscope (8e) sends a signal, the main engine (8a) stops running, the air inlet pipeline built-in electromagnet (6c) and the built-out electromagnet (7c) are powered on, the air inlet system (6) and the smoke exhaust system (7) are isolated from an external environment, the unmanned ship is completely watertight, and the unmanned ship is gradually self-righting, the digital gyroscope (8e) sends a signal again, the air inlet pipeline built-in electromagnet (6c) and the built-out electromagnet (7c) are powered off, the air inlet system (6) and the smoke exhaust system (7) are communicated with the external environment, and the main engine (8a) starts to run;

during turning off the air inlet system (6), the air inlet pipeline built-in electromagnet (6c) is powered on and attracts the air inlet mechanism metal piece (6g), the air inlet cover connection spring (6b) is compressed, and then the air inlet mechanism (6e) is pulled, so that the mushroom-shaped air inlet cover (6a) is closed;

during turning on the air inlet system (6), the air inlet pipeline built-in electromagnet (6c) is powered off, the air inlet cover connection spring (6b) is restored to a normal state, and the mushroom-shaped air inlet cover (6a) is open topped by the air inlet mechanism (6e);

during turning off the smoke exhaust system (7), the built-out electromagnet (7c) is powered on and attracts the smoke exhaust mechanism metal piece (7g), the smoke exhaust cover connection spring (7b) is compressed, and then the smoke exhaust mechanism (7e) is pulled, so that the hinge-type smoke exhaust cover (7a) is closed; and during turning on the smoke exhaust system (7), the built-out electromagnet (7c) is powered off, the smoke exhaust cover connection spring (7b) is restored to a normal state, and the hinge-type smoke exhaust cover (7a) is open topped and rotated by a three-stage hinge of the smoke exhaust mechanism (7e).

* * * * *